United States Patent
Fukuda et al.

(10) Patent No.: US 7,610,598 B2
(45) Date of Patent: Oct. 27, 2009

(54) RECORDING APPARATUS THAT SWITCHES DECODING METHODS BETWEEN DATA RECEIVED OVER THE INTERNET AND DATA RECEIVED OVER A BROADCAST NETWORK

(75) Inventors: Tetsu Fukuda, Kanagawa (JP); Shigeki Mori, Saitama (JP); Katsuhiro Miyamoto, Kanagawa (JP); Shuntaro Aratani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1113 days.

(21) Appl. No.: 10/679,334

(22) Filed: Oct. 7, 2003

(65) Prior Publication Data

US 2004/0107449 A1 Jun. 3, 2004

(30) Foreign Application Priority Data

Oct. 22, 2002 (JP) ............................. 2002-307273

(51) Int. Cl.
*H04N 7/025* (2006.01)
*H04N 7/10* (2006.01)
*H04N 7/173* (2006.01)

(52) U.S. Cl. ..................... 725/32; 725/110; 725/134

(58) Field of Classification Search ................ 725/109, 725/110, 32–36, 51, 112
See application file for complete search history.

(56) References Cited

U.S. PATENT DOCUMENTS

| | | | | |
|---|---|---|---|---|
| 5,721,829 A | * | 2/1998 | Dunn et al. | 725/87 |
| 2001/0042111 A1 | | 11/2001 | Douzono | 709/219 |
| 2002/0010930 A1 | * | 1/2002 | Shah-Nazaroff et al. | 725/42 |
| 2002/0016964 A1 | | 2/2002 | Aratani et al. | 725/39 |
| 2002/0051083 A1 | | 5/2002 | Aratani et al. | 348/554 |
| 2002/0060748 A1 | | 5/2002 | Aratani et al. | 348/552 |
| 2002/0083442 A1 | * | 6/2002 | Eldering | 725/34 |
| 2002/0116510 A1 | * | 8/2002 | Bacso et al. | 709/230 |
| 2002/0197973 A1 | | 12/2002 | Yoshimoto | 455/303 |
| 2004/0068740 A1 | | 4/2004 | Fukuda et al. | 725/45 |

FOREIGN PATENT DOCUMENTS

| | | |
|---|---|---|
| EP | 1 156 669 | 11/2001 |
| EP | 1156669 A2 * | 11/2001 |
| JP | 2001-268470 | 9/2001 |
| JP | 2001-318848 | 11/2001 |
| JP | 2002-51023 | 2/2002 |
| WO | WO 01/45308 | 6/2001 |

* cited by examiner

*Primary Examiner*—Andrew Y Koenig
*Assistant Examiner*—Jasmine Stokely-Collins
(74) *Attorney, Agent, or Firm*—Fitzpatrick, Cella, Harper & Scinto

(57) ABSTRACT

In order to switch the transmission medium between the Internet and broadcast waves, reception/playback of communication data received via first media, such as via the Internet from an external device, and broadcast data received via second media, such as via a broadcast network from a broadcast station, is switched.

7 Claims, 9 Drawing Sheets

FIG. 9

|  | num of bit | value |
|---|---|---|
| DSMCC_section(stream description){ |  |  |
|     table id | 8 | 0x3D |
|     section syntax indicator | 1 | 1 |
|     private indicator | 1 | 0 |
|     reserved | 2 |  |
|     dsmcc section length | 12 |  |
|     data event id | 4 |  |
|     event msg group id | 12 | 0x000 |
|     reserved | 2 |  |
|     version number | 5 |  |
|     current next indicator | 1 | 1 |
|     section number | 8 | 0x00 |
|     last section number | 8 | 0x00 |
|     for(I=0; I<N; I++){ |  |  |
|         General event descriptor(){ |  |  |
|             descriptor tag | 8 | ※ |
|             descriptor length | 8 |  |
|             event msg group id | 12 | 0x000 |
|             reserved future use | 4 |  |
|             time mode | 8 | 0x00 |
|             if(time mode == 0x00){ |  |  |
|                 reserved future use | 40 |  |
|             }else{ |  |  |
|                 reserved future use | 4 |  |
|                 event msg NPT | 36 |  |
|             } |  |  |
|             event msg type | 8 | 0x01 |
|             event msg id | 16 |  |
|             for(I=0; I<N; I++){ |  |  |
|                 private data byte | 8 |  |
|             } |  |  |
|         } |  |  |
|         CRC 32 | 32 |  |
|     } |  |  |
| } |  |  |

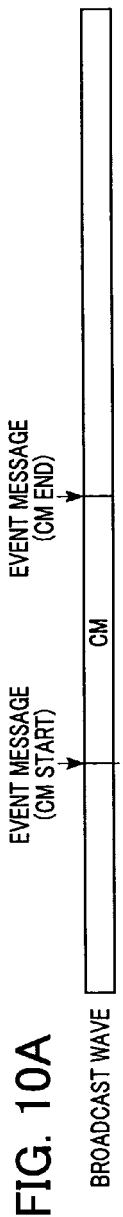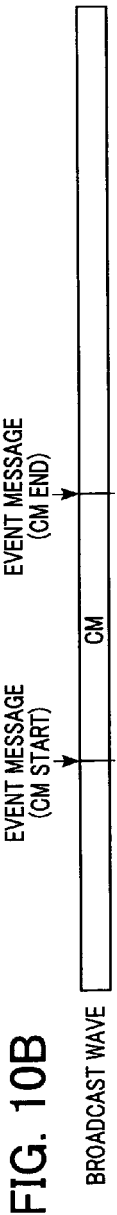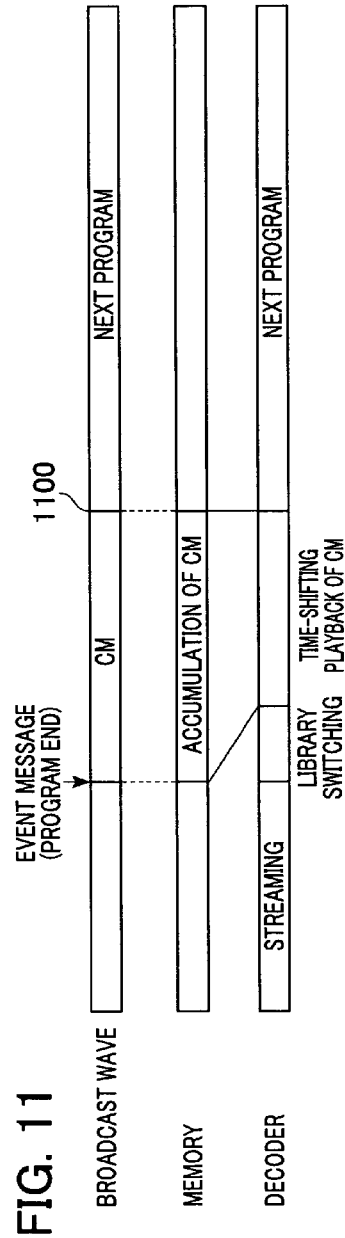

RECORDING APPARATUS THAT SWITCHES DECODING METHODS BETWEEN DATA RECEIVED OVER THE INTERNET AND DATA RECEIVED OVER A BROADCAST NETWORK

BACKGROUND OF THE INVENTION

1. Field of the Invention

The present invention relates to a receiving apparatus for receiving a television broadcast program via a plurality of different media, in which the display content can be switched at any time desired by a broadcast station. In particular, the present invention relates to a receiving apparatus capable of controlling a streaming program provided by a television broadcast station based on an event message or the like to offer a commercial message (CM), etc., to all subscribers at arbitrary times and capable of seamlessly switching between the streaming program and the CM.

2. Description of the Related Art

With the development of technologies such as ADSL (asynchronous digital subscriber line), cable TV, and optical fibers, high-speed Internet access services, called broadband services, have rapidly become widespread. Current broadband services support communication rates as high as 512 Kbps (kilobits per second) to several Mbps (megabits per second).

The communication rate of traditional dial-up Internet access via analog telephone communication is no more than about 28.8 to 56 Kbps. The communication rate of general ISDN (Integrated Services Digital Network) services capable of digital transmission of communication data is from 64 Kbps to 128 Kbps. The communication services at communication rates no more than 128 Kbps make it difficult to provide real-time transmission of TV or VHS-quality video signals, whereas broadband services sufficiently support practical use of video transmission, etc., and have the potential for making greater use of the Internet or personal computers (PCs). Japanese Patent Application Laid-Open No. 2001-318848 (US A1 20010042111) discloses an apparatus for making a request for distribution of content, downloading and recording the content, and playing back the recorded content.

One broadband service is program streaming. Streaming is a technique which enables a user to sequentially play back audio data or motion picture data stored on a server while downloading it via a network. The streaming technique can be used to play back even motion picture data having a large file size without waiting for a time-consuming download, and can also be used to distribute captured motion pictures in real time. The streaming technique in a broadband environment allows users to enjoy high-quality content on their PCs.

The demands to handle Internet content, e-mail, still images taken by a digital still camera, etc., on a television screen using a TV remote control unit, as if they were being viewed on TV, have also increased, and products meeting these demands have become commercially available. In view of such a background, viewing of streaming programs will be incorporated as a function of television receiving apparatuses. Then, even PC novices can enjoy streaming broadcasts on TV with ease.

Recently, a variety of information has been digitally transmitted, and the popularity of digital broadcasting of television programs has also increased. Digital satellite broadcasting services, such as CS (Communication Satellite) broadcasting and BS (Broadcasting Satellite) broadcasting, have already begun, and digital terrestrial broadcasting services will also start. One of the merits of digital broadcasting is information compression. Digital compression techniques allow for multiple-channel transmission using the bandwidth corresponding to one traditional analog broadcasting channel. In BS digital broadcasting, actually, a plurality of channels share a single frequency band. The number of shared channels in SD (standard definition) broadcasting is typically three to four, although it depends upon the bit rate of the content, etc.

Although digital compression techniques allow for multiple-channel transmission, the frequency bandwidth is finite. When a multiple-content program including 10 to 20 items is provided from a broadcast station, it is difficult to provide the program to users with sufficiently high definition. Therefore, the demands for broadcast stations to utilize the above-described streaming techniques to provide multi-content programs is considered.

In viewing streaming programs on a television receiving apparatus, switching between two media, i.e., broadcast waves and streaming, is important. Seamless switching will provide users with a comfortable viewing experience. On the other hand, if the switching causes the content to be interrupted, or if the switching takes a long time, users will not be satisfied with this service.

SUMMARY OF THE INVENTION

It is an object of the present invention to provide a receiving apparatus and method which allow for switching between a plurality of transmission media, such as the Internet and broadcast waves, so that the media switching provides users with a comfortable viewing experience of, for example, both communication data and broadcast data.

It is another object of the present invention to provide a receiving apparatus and method which prevent interruption of content of broadcast data caused by media switching.

In an aspect of the present invention, a receiving apparatus includes a first data receiving unit for receiving data via a first medium, a second data receiving unit for receiving data via a second medium, and a switching unit for, in response to an event message, switching reception and/or playback of the data received by the first data receiving unit and the data received by the second receiving unit.

In another aspect of the present invention, a receiving method for a receiving apparatus including a first data receiving unit for receiving data via a first medium and a second data receiving unit for receiving data via a second medium includes the step of, in response to an event message, switching reception and/or playback of the data received by the first data receiving unit and the data received by the second data receiving unit.

In the present invention, the first data receiving unit may be a communication data receiving unit for receiving communication data via the Internet from an external device, and the second data receiving unit may be a broadcast data receiving unit for receiving broadcast data sent from a broadcast station via a broadcast network. Preferably, the receiving apparatus of the present invention further includes a decoder for decoding the communication data received by the communication data receiving unit and the broadcast data received by the broadcast data receiving unit using different decoding methods; and a switching unit for switching between the decoding methods executed by the decoder.

In a preferred embodiment, when broadcast data is received by the broadcast data receiving unit, the switching unit switches the decoding method performed by the decoder to a broadcast data decoding method from a communication data decoding method.

In a preferred embodiment, the receiving apparatus further includes a first recording unit for recording the broadcast data received by the broadcast data receiving unit. In the preferred embodiment, when broadcast data is received by the broadcast data receiving unit, the switching unit performs switching control of the decoding method performed by the decoder from a communication data decoding method to a broadcast data decoding method, and the broadcast data received by the broadcast data receiving unit is recorded in the first recording unit. After switching the decoding method to the broadcast data decoding method from the communication data decoding method, the decoder decodes the broadcast data recorded in the first recording unit.

In a preferred embodiment, in response to an event message indicating that a commercial message starts or indicating that content such as news starts, the switching unit switches data reception from reception of data via first media, e.g., reception of data from an external device via the Internet, to reception of data via second media, e.g., reception of data from a broadcast station via a broadcast network.

In a preferred embodiment, the receiving apparatus further includes a second recording unit for recording information on communication data of a program received by the communication data receiving unit. In the preferred embodiment, in response to an event message indicating that the program ends, the communication data receiving unit interrupts reception of the communication data of the program. When a playback request of the program is made again, the communication data receiving unit receives the remaining communication data of the program from the external device based on the information on the communication data of the program recorded in the second recording unit.

In a preferred embodiment, the information on the communication data of the program includes identification information of the program and a playback duration of the program.

In a preferred embodiment, the event message is a DSMCC event message.

In a preferred embodiment, a media control system includes a plurality of apparatuses which are connected so as to communicate with each other. At least one of the plurality of apparatuses includes a receiving apparatus having any one of the above-described features.

In a preferred embodiment, a media control method for a decoder for decoding communication data received by a communication data receiving unit from an external device via the Internet and broadcast data received by a broadcast data receiving unit from a broadcast station via a broadcast network using different decoding methods includes the step of switching between the decoding methods of the decoder.

In a preferred embodiment, there is provided a program for causing a computer to execute the above-described media control method.

In a preferred embodiment, a computer-readable recording medium has the above-described program recorded therein.

According to the present invention, therefore, the decoding process of a decoder can be switched between communication data received via the Internet, such as a streaming program, and broadcast data received via a broadcast network, such as a CS broadcast program. The transmission medium can also be switched between the Internet and broadcast waves, and this media switching control provides users with a comfortable viewing experience of both the communication data and the broadcast data.

According to the present invention, when the decoding process is switched from the communication data decoding process to the broadcast data decoding process, broadcast data from the time when the switching operation starts is recorded, and the recorded broadcast data is decoded when the switching operation is completed. This avoids interruption of the content of the broadcast data caused by switching between the decoding processes. The present invention is directed to a switching mechanism for switching reception or playback of data obtained via a plurality of media, and switching between the decoding methods is not essential.

Further objects, features and advantages of the present invention will become apparent from the following description of the preferred embodiments with reference to the attached drawings.

BRIEF DESCRIPTION OF THE DRAWINGS

FIG. 9 is a view showing the structure of DSMCC_section indicating an immediate-reaction-type event message.

FIGS. 10A and 10B are timing charts showing media library switching based on an event message.

FIG. 11 is a timing chart when the event message indicates program end.

DESCRIPTION OF THE PREFERRED EMBODIMENTS

Preferred embodiments of the present invention are described in detail below with reference to the drawings.

First Embodiment

A television receiving apparatus 100 according to a first embodiment of the present invention is described with reference to FIG. 1.

Figure 1:
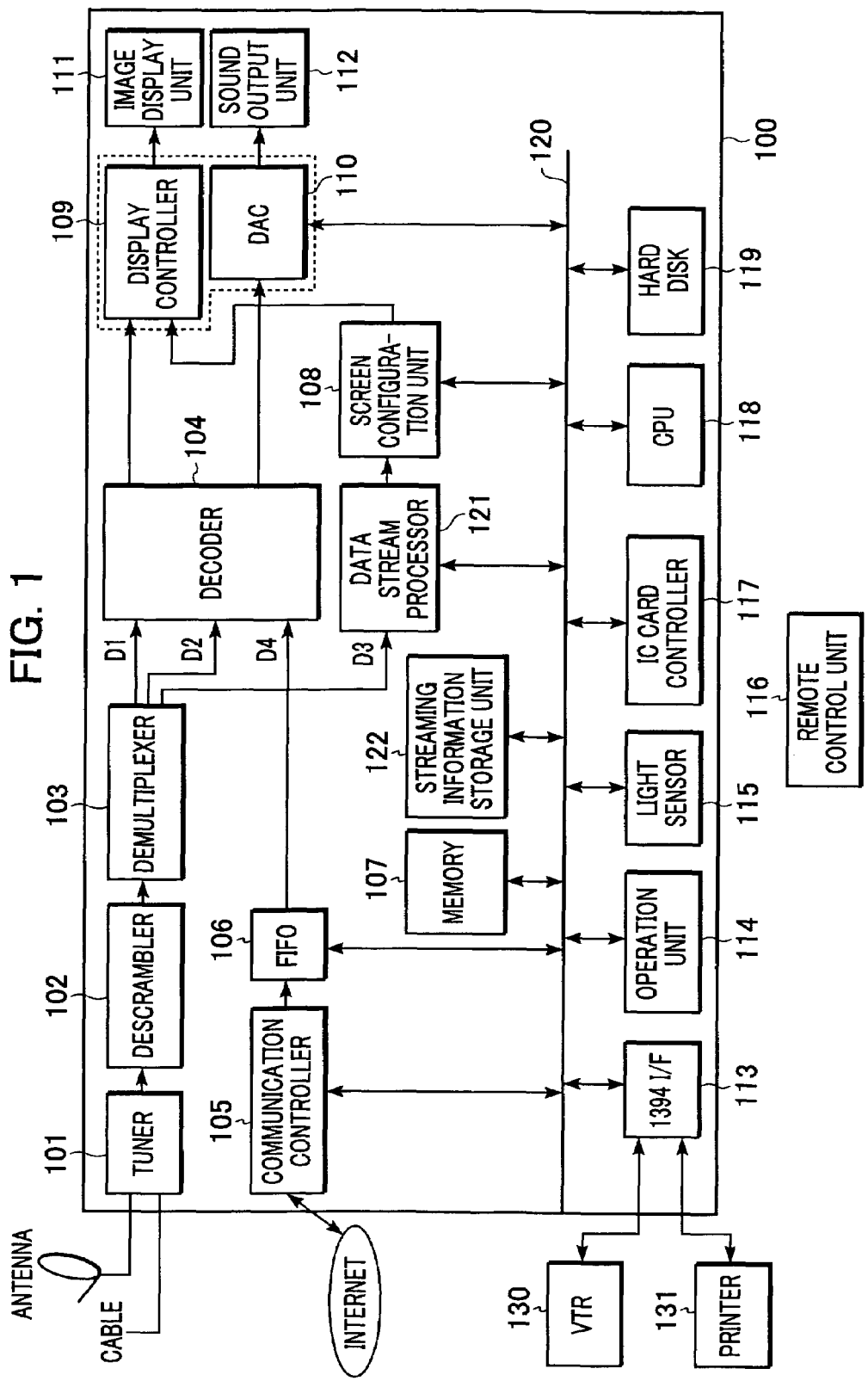
FIG. 1 is a block diagram of a television receiving apparatus according to a first embodiment of the present invention.

In FIG. 1, a signal received by an antenna is input to a tuner 101. The tuner 101 performs processing, such as demodulation and error correction, on the input signal to generate digital data, called a transport stream (TS). The generated transport stream (TS) data is output to a descrambler 102.

When TS data which is scrambled for content subscription restriction is input from the tuner 101, the descrambler 102 descrambles the TS data based on descrambling key information, which is contained in the TS data, and key information output from an IC card controller 117, and outputs the descrambled data to a demultiplexer 103.

The IC card controller 117 includes an IC card containing the user's subscription information and key information for decoding the descrambling key information contained in the TS data. If the IC card controller 117 includes key information for decoding the key information input to the descrambler 102, this key information is output to the descrambler 102. When TS data which is not scrambled is input from the tuner 101, the descrambler 102 outputs the TS data to the demultiplexer 103 directly.

From the TS data input from the descrambler 102, which contains time-division-multiplexed video data, audio data, electronic program guide (EPG) data, data-broadcasting data, etc., of multiple channels, the demultiplexer 103 extracts video data D1 and audio data D2 of a program which is being broadcast on a channel selected by operation of an operation unit 114 or a remote control unit 116, and outputs the video data D1 and the audio data D2 to a decoder 104. In the first embodiment, the decoder 104 may be a media processor for performing a decoding process by installing software. The software and its related library are obtained via a bus 120 from a memory 107. The demultiplexer 103 further extracts data-broadcasting/EPG data D3 from the input TS data, and inputs the extracted data to a data stream processor 121. The data-broadcasting/EPG data D3 processed by the data stream processor 121 is loaded into the memory 107, and is subjected to software processing by a CPU, as described below, after which the result is stored in a hard disk 119.

The TS data is transmitted packet-by-packet, and contains PID (packet identification) at the beginning of each packet. The demultiplexer 103 reads the PID to identify the video data D1, the audio data D2, or the data-broadcasting/EPG data D3.

First, the video data D1 is described. The decoder 104 decodes the video data D1 input from the demultiplexer 103 using MPEG-2 decoding, and outputs the decoded video data to a display controller 109. The display controller 109 switches or divides the screen according to the operation of the decoder 104 or the remote control unit 116 to display the video data on an image display unit 111. When the display controller 109 receives a combination of video data, audio data, and data-broadcasting/EPG data, it synthesizes an image and outputs the resulting image to the image display unit 111. A screen configuration unit 108 is described below. The image display unit 111 includes a monitor and a video-signal input terminal (these components are not shown).

Second, the audio data D2 is described. The decoder 104 decodes the audio data D2 input from the demultiplexer 103 using MPEG-2 decoding, and outputs the decoded audio data to a DAC 110. The DAC 110 D/A (digital-to-analog) converts the audio data input from the decoder 104, and outputs the resulting data to a sound output unit 112. The sound output unit 112 includes a speaker and an audio-signal input terminal (these components are not shown).

Then, the data-broadcasting/EPG data D3 is described. The EPG (electronic program guide) data is transmitted with the data structure specified by the ARIB (Association of Radio Industries and Businesses) standard "program arrangement information used for digital broadcast" or the like. The EPG data mainly contains an SDT (Service Description Table) which carries channel information including the channel name and the broadcaster name, a BAT (Bouquet Association Table) which carries bouquet information including the name of a bouquet (the bouquet is a collection of organized channels) and the channels, EIT (Event Information Table) which carries program information including program titles, the start time and day of broadcasts, and the description of content, and a TDT (Time Data Table) which carries information of current time and date. In the EIT, the EPG data is described as a descriptor together with some items, and is configured and displayed in the so-called EPG format by the data stream processor 121 and the screen configuration unit 108.

In data broadcasting, digital data is repeatedly sent from a broadcast station according to the DSMCC (digital storage media command and control) data carousel. The data-broadcasting data which is filtered by the demultiplexer 103 contains text information, script information, image information, and video and audio data. The text information is described in BML (Broadcast Markup Language). BML is an XML (extensible Markup Language) based script language for use in digital broadcasting, using ECMA Script as the script.

The data-broadcasting/EPG data D3 is decoded by the data stream processor 121 into the EPG data formed of text information and image information, and the data-broadcasting data formed of text information, image information, and video and audio data, and is then input to the memory 107 via the bus 120. A CPU 118 performs processing on the data-broadcasting data, and stores the resulting data, which contains display XML data, in the hard disk 119. When a data-broadcasting display instruction is input using the operation unit 114 or from a light sensor 115, the CPU 118 reads the display BML data from the hard disk 119 and outputs it to the screen configuration unit 108.

The screen configuration unit 108 outputs a video signal to the display controller 109 based on the data processed and output by the CPU 118. As described above, the display controller 109 outputs the video signal to the image display unit 111 in order to switch among a video screen, a data-broadcasting screen, etc., and to display a synthesis image.

A communication controller 105 performs control in accordance with a communication protocol via the Internet. The communication protocol may be TCP/IP (Transmission Control Protocol/Internet Protocol), UDP (User Datagram Protocol), HTTP (Hyper Text Transfer Protocol), or the like. Such a protocol is used to make a request for delivery of streaming data and to receive the data from a stream distribution server.

A FIFO (first-in first-out) 106 buffers streaming data necessary for playback of a streaming program. When the decoder 104 decodes streaming data D4, the media library of the decoder 104 is switched to the media library for streaming data decoding, which is stored in the memory 107, to read the streaming data from the FIFO 106 for video and audio decoding. The decoded video is output to the display controller 109 and the decoded audio is output to the sound output unit 112 via the DAC 110. A streaming information storage unit 122 stores a streaming playback duration, e.g., "0:00:00", in units of hours, minutes, and seconds. When playback of streaming data is halted, the value of the streaming information storage unit 122 is set to a null value (negative value).

An IEEE 1394 interface 113 is also connected with the bus 120 for protocol communication with a VTR 130 or a printer 131 externally connected to the television receiving apparatus 100.

Figure 2:
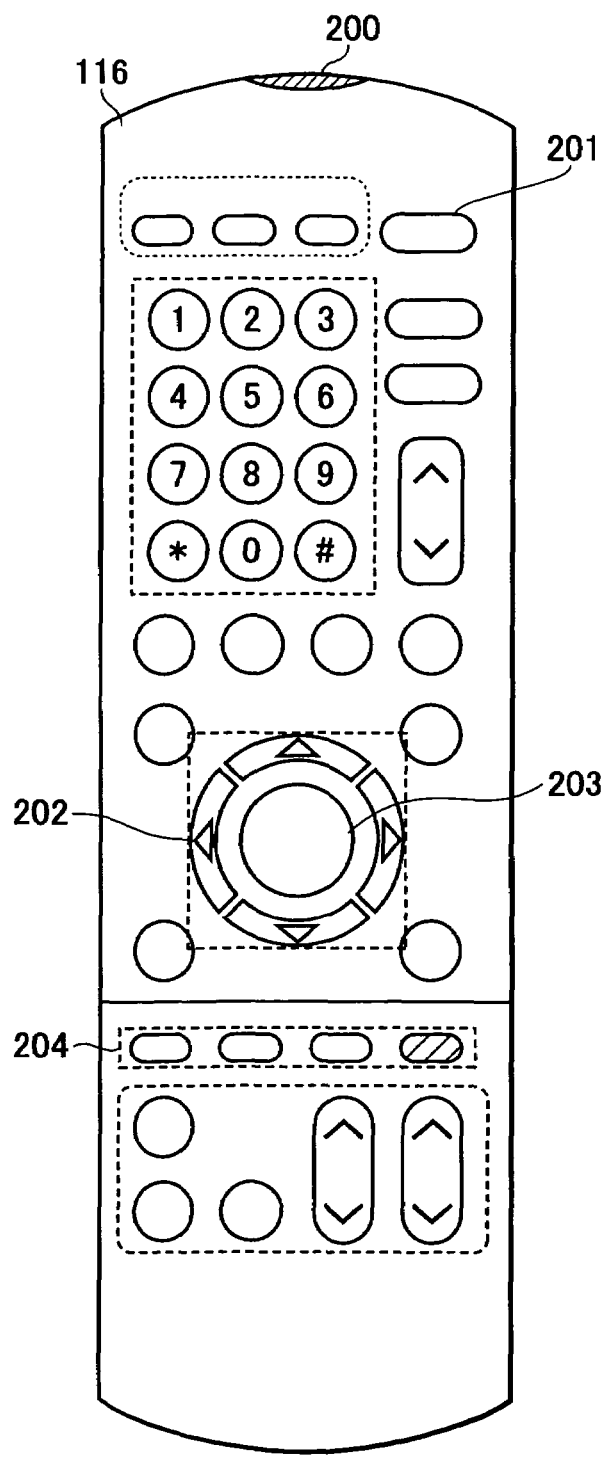
FIG. 2 is an external view of a remote control unit which can be used in the first embodiment and a second embodiment of the present invention.

The remote control unit 116 are shown in FIG. 2. In FIG. 2, the buttons for realizing the functions essential to the first embodiment are only shown, but the buttons required for an actual use of the receiving apparatus 100 are not limited to the illustrated buttons. As an alternative to the remote control unit 116 shown in FIG. 2, in the first embodiment, a pointing device, such as a mouse, may be used.

In FIG. 2, the remote control unit 116 includes a light transmitter 200 for infrared communication with the light sensor 115 of the television receiving apparatus 100 shown in FIG. 1, a power key 201 for turning on/off the television receiving apparatus 100, cursor keys 202 for moving a selection cursor in the up, down, right, and left directions, a set key 203 for setting an area selected using the cursor keys 202, and four keys 204, called color keys, of "blue", "red", "green", and "yellow" from the leftmost key. Other keys shown in FIG. 2 are used for achieving various functions of the digital television receiving apparatus, but are not used in the first embodiment, and a description thereof is thus omitted.

The operation of the television receiving apparatus of the first embodiment, a media control system, and a program distribution service is described below.

Figure 3:
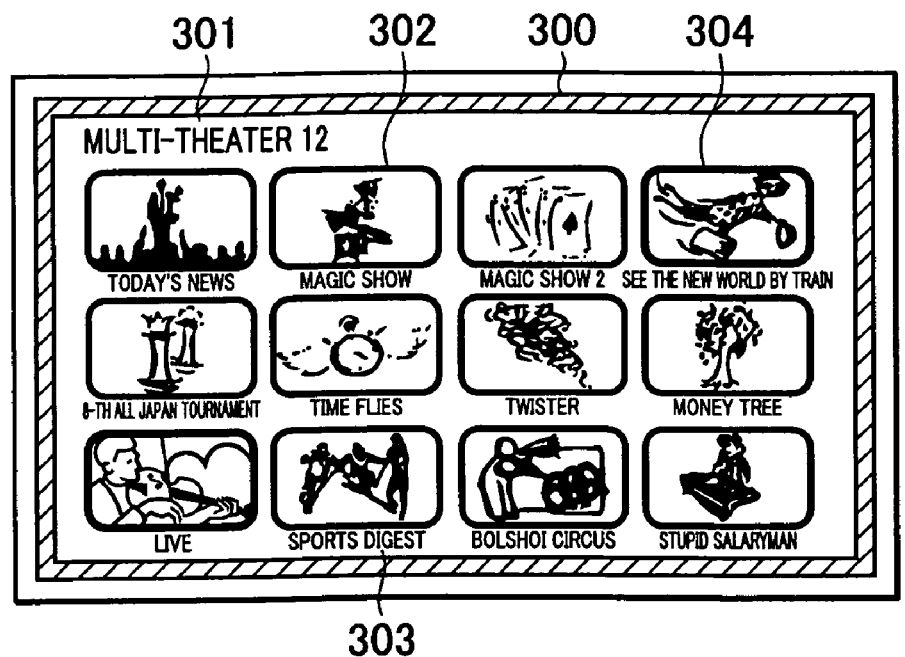
FIG. 3 is an illustration of a multi-screen program containing streaming programs provided by a television broadcast station.
Figure 4:
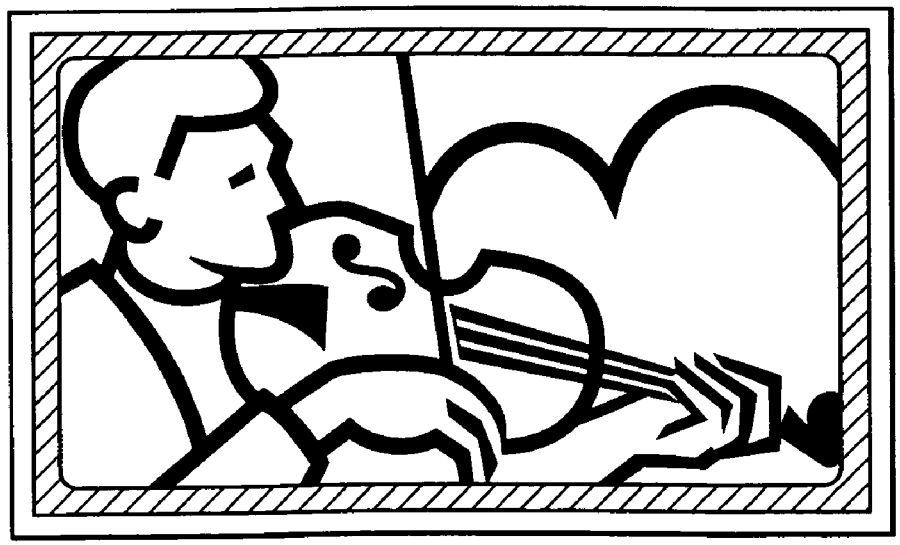
FIG. 4 is a view showing a full-screen display of a selected streaming program.

First, the content of a broadcast program provided by a television broadcast station according to the first embodiment is described. FIG. 3 shows a display 300 of such a program (hereinafter referred to as a multi-screen program). The display 300 includes the title 301 of the multi-screen program. Streaming programs are represented by small views 302. FIG. 3 shows 12 views corresponding to 12 streaming programs. Each of the streaming programs 302 has a title 303. One of the streaming programs 302 is selected using a focus 304. The user uses the cursor keys 202 of the remote control unit 116 to move the focus 304 onto a streaming program which he/she wants to view, and then presses the set key 203 in order to view the desired streaming program. As a result, the desired streaming program is put into full screen view, as shown in FIG. 4, and the streaming program starts by executing a series of operations. The operation of the television receiving apparatus until full screen view is described below. In the first embodiment, during broadcasting time, a television broadcast station offers such a streaming program-based multi-screen program.

Figure 5A:
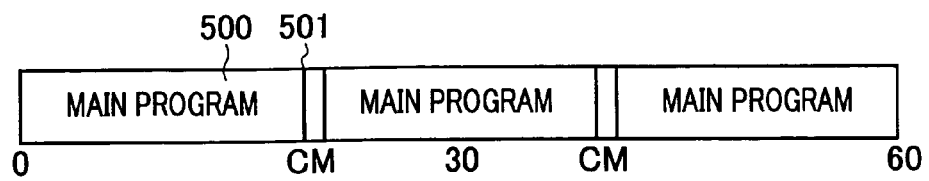
FIGS. 5A and 5B are timing charts showing a streaming selection view which is the main part of the multi-screen program, a commercial message (CM), and a selected streaming program.
Figure 5B:
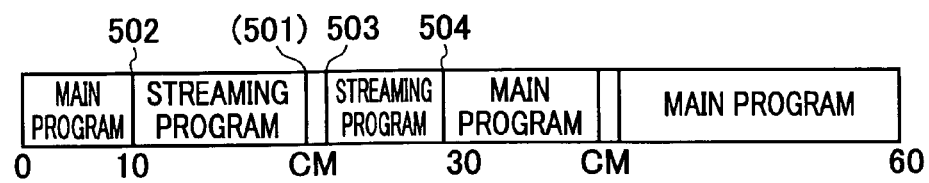

In the first embodiment, it is assumed that the broadcasting time of the multi-screen program is 60 minutes. Like standard programs, several-second commercial messages (CMs) are inserted in the main part of the multi-screen program. FIG. 5A is a time chart of the main part of a multi-screen program and commercial messages (CMs). During a broadcasting time 500 of the main program, the streaming selection view shown in FIG. 3 is presented. At time 501, a CM is broadcasted rather than the main streaming selection view. The user can select a desired streaming program only when the main program is being broadcasted. FIG. 5B is a time chart showing that a user selects a desired streaming program during the broadcasting time of the main program. If the selected streaming program is 20 minutes long, the streaming program, which is obtained via the Internet, is presented on the screen for 20 minutes from the time 502 at which it was selected. At the CM broadcasting time 501, the streaming program is interrupted, and the screen is switched to show the CM being broadcasted. At the CM broadcast end time 503, the interrupted streaming program resumes. When the selected 20-minute streaming program ends at time 504, the broadcast video (the main program or a CM) resumes. Accordingly, the user can select and view a desired streaming program during the broadcasting time of a multi-screen program.

Figure 6:
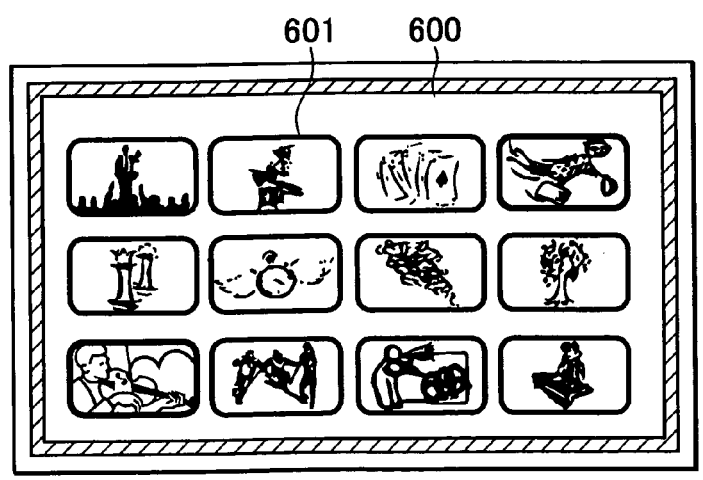
FIG. 6 is a view showing moving pictures of the multi-screen program which are transmitted in PES via broadcast waves.

FIG. 6 shows a display 600 of a multi-screen program in which motion pictures transmitted in a packetized elementary stream (PES) via broadcast waves are presented. In the first embodiment, the PES information only contains video but does not contain sound. Video for repeatedly playing back 12 streaming-program moving pictures 601 is broadcasted as one video program.

Figure 7:
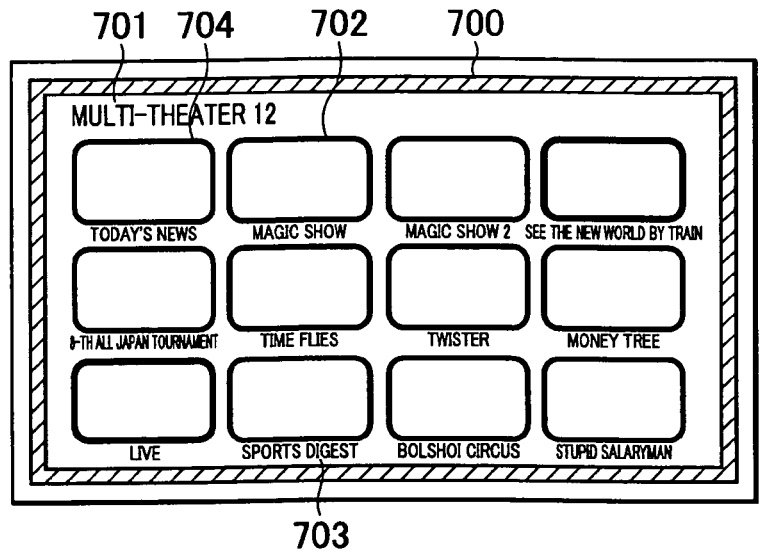
FIG. 7 is a view showing a display of BML carousel data of the multi-screen program which is transmitted via broadcast waves.

FIG. 7 shows a display 700 of BML carousel data of a multi-screen program which is transmitted via broadcast waves. The display 700 includes the title 701 of the multi-screen program. The title 701 may be described in BML as characters or may be incorporated in BML as an image. Streaming programs are represented by frames 702. Each of the streaming programs 702 has a program title 703 which is described in BML as characters. A streaming program selected by a user is distinguished using a focus 704, and the focus 704 can be shifted by using the cursor keys 202 of the remote control unit 116. A navigation index and focus style are used to clearly show which streaming program frame 702 is focused, and to precisely describe how the focus 704 moves. The navigation index is configured such that each object is assigned an ID and the target object of the focus 704 is described using Nav-Up, Nav-Down, Nav-Left, and Nav-Right attributes. The focus style is configured such that a style sheet is used to specify the style of the focus, thus allowing a user to distinctly know where the focus 704 is applied.

When the broadcast-wave BML carousel content is received, the television receiving apparatus 100 performs the above-described decoding operation, and starts a BML browser. Consequently, the image of the multi-screen program shown in FIG. 3 is displayed on the image display unit 111 in combination with the motion pictures transmitted in PES shown in FIG. 6. Movement of the focus 704 may be described using the navigational index, or may be uniquely described in a script.

The operation for the user to select desired streaming content from the displayed multi-screen program shown in FIG. 3 is described below. While viewing the multi-screen program, the user moves the focus 304 to a desired streaming program on the screen using the cursor keys 202 of the remote control unit 116. When the set key 203 of the remote control unit 116 is pressed in this state, this streaming program starts (see FIG. 4).

When a streaming program is selected by the user, the following two operations are performed according to a BML-based script.

One of the operations is to obtain from the selected BML object the URL of a streaming server to which the television receiving apparatus 100 is to connect. Based on this URL, streaming transmission and reception is established between the streaming server and the television receiving apparatus 100 to start streaming reception.

Figure 8:
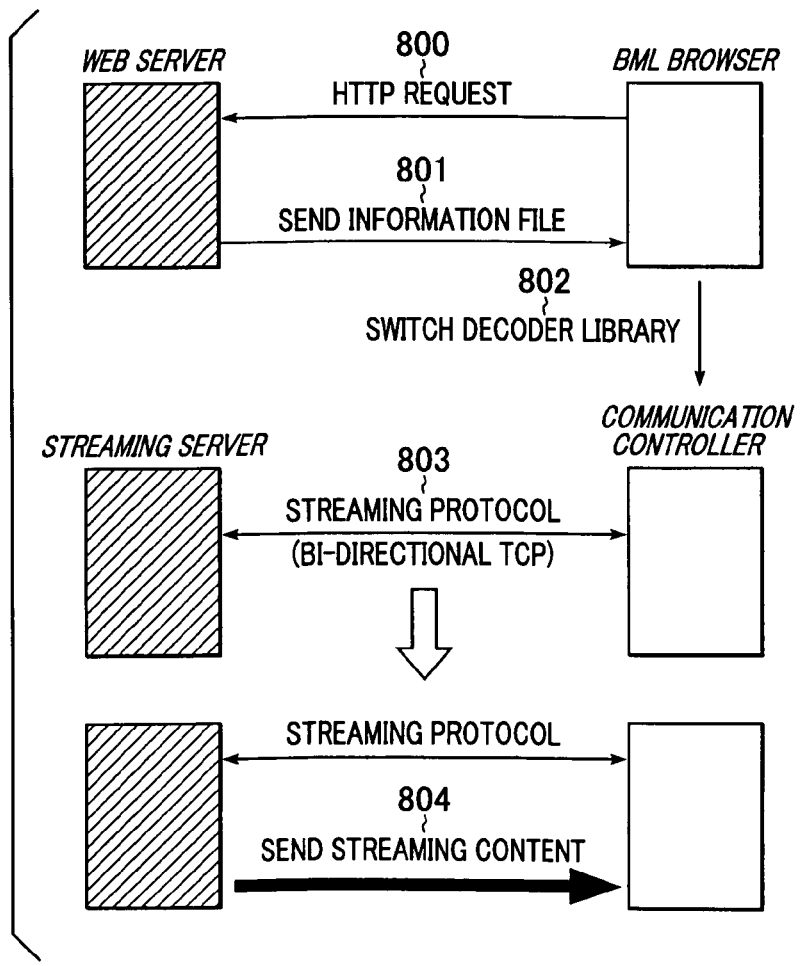
FIG. 8 is a view showing the concept of a procedure to establish streaming transmission and reception between a streaming server and a television receiving apparatus.

The procedure to establish streaming transmission and reception are described with reference to FIG. 8. When a user selects a desired streaming program by operating the BML browser using the remote control unit 116, the URL of a web server providing information on this program is obtained according to the BML-based script. An information file request is sent to the web server (800). In response to the request, the web server sends the information file to the BML browser (801). The information file contains the location of the streaming server, the type of protocol, and so forth.

When receiving the information file, the BML browser passes the file to the communication controller 105 (802). At this time, as shown in FIG. 8, a decoder switching process described below in detail is carried out (802). The communication controller 105 establishes a bi-directional TCP connection with the streaming server based on the passed information file (803). This enables control according to the designated streaming protocol. The streaming server establishes a uni-directional UDP connection with the communication controller 105 according to a protocol-based command to start sending the content (804).

The second operation is to change the library of a media processor, which is a decoder, from the broadcast-wave library to the streaming library. The script indicating such description is undefined at present, and the following script is newly defined as a BML-based script:

Browser.setDecoder(xx);

where the argument is set to the value indicating a TS decoder or a streaming decoder. In response to the request, the CPU 118 of the television receiving apparatus 100 causes the decoder 104 to stop the TS decoding in progress, and fetches the streaming decoding library from the memory 107 to change to this library.

After the above-described procedure, the streaming program content received by the communication controller 105 is buffered in the FIFO 106, and is decoded by the decoder 104. The decoded content is passed to the display controller 109 and is displayed on the image display unit 111 in the manner shown in FIG. 4. In playing back the streaming program content, a transmission continuation request, a suspension request, or the like of the streaming program content is sent to the web server depending upon the amount of data stored in the FIFO 106. When streaming playback starts, the streaming information storage unit 122 obtains the playback duration from a timer (not shown) and stores it.

In the first embodiment, even in decoding or displaying the streaming program, the television receiving apparatus 100 still extracts the data-broadcasting/EPG data D3 from the received TS data through the tuner 101 and the demultiplexer 103 (and, in some cases, the descrambler 102), and receives and interprets it by the data stream processor 121. The data received by the television receiving apparatus 100 is a DMSCC event message sent from a broadcast station broadcasting a multi-screen program in order to offer commercial messages to the user. Alternatively, this data may be an event message sent in order to offer up-to-date information, such as urgent news or latest news, to the user.

A DSMCC event message allows a short message to be immediately reported to a tuner from a broadcast station. The event message is not sent by data carousel transmission but is sent by data section transmission, and requires less time to receive. There are two types of event messages. One is the immediate reaction type; when a broadcast station broadcasts an event message of this type, a tuner receives this information and takes immediate action. The other is the time appointment type (on schedule type); an event message of this type contains information indicating an action time. A broadcast station broadcasts this type of event message immediately before the action time. When a television receiving apparatus receives a time-appointment-type event message, it does not immediately take an action, but takes an action at the time designated in the event message. In the first embodiment, the former type, i.e., an immediate-reaction-type event message, is used; however, it is understood that the latter type, i.e., a time-appointment-type event message, also achieves a similar advantage.

FIG. 9 shows the structure of DSMCC_section indicating an immediate-reaction-type event message. The table shown in FIG. 9 includes blank columns containing a value specified by the ARIB standard or a value which need not be cared about in the first embodiment. In this table, attention should be paid to the value of "descriptor tag" (*). In the first embodiment, this value is set to 0xC9, 0xCA, or 0xCB, which is reserved in the standard. Descriptor tag=0xC9 indicates that a commercial message starts; descriptor tag=0xCA indicates that a commercial message ends; and descriptor tag=0xCB indicates that a program ends, as described in detail below.

A broadcast station sends an immediate-reaction-type event message, wherein descriptor tag=0xC9, to offer a commercial message at the same time to all subscribers of the multi-screen program (including subscribers who view the streaming selection view and subscribers who view the streaming programs). Upon reception of this event message, the data stream processor 121 of the television receiving apparatus 100 performs one of the following two operations depending upon the information stored in the streaming information storage unit 122.

In a case where the streaming information storage unit 122 stores a null value (negative value) indicating that the streaming is being halted, the broadcast-wave data is continuously decoded. On the other hand, in a case where the streaming information storage unit 122 stores a playback duration indicating that streaming program playback is in progress, streaming decoding stops, and the media library of the decoder 104 is changed so that the broadcast-wave TS is decoded. The latter case is assumed herein. When streaming decoding is halted, each of the streaming information storage unit 122 and the FIFO 106 still holds its content. A suspension request of the streaming program content is sent to the streaming server. As shown in FIG. 10A, if it takes a long time to change the media library, the beginning of a broadcast-wave commercial message may not be presented to the subscriber.

In the first embodiment, as shown in FIG. 10B, upon receiving an event message indicating CM start, the data stream processor 121 changes the media library of the decoder 104, and accumulates CM broadcast TS data in the memory 107 in order to prevent CM broadcasting failure. When the media library switching is completed, the decoder 104 decodes the CM broadcast TS data accumulated in the memory 107 from the beginning so as to be displayed on the screen via the display controller 109 and the image display unit 111. This prevents the beginning of the CM being missed due to the media library switching, resulting in a comfortable viewing experience for the subscriber.

Like the above-described event message indicating CM start, the broadcast station sends an immediate-reaction-type event message, wherein descriptor tag=0xCA, indicating CM end. Upon receiving this event message, like reception of the event message indicating CM start, the data stream processor 121 of the television receiving apparatus 100 performs one of the following two operations depending upon the information stored in the streaming information storage unit 122.

When the streaming information storage unit 122 stores a null value (negative value) indicating that the streaming is being halted, the broadcast-wave data is continuously decoded. On the other hand, when the streaming information storage unit 122 stores a playback duration indicating that streaming program playback is in progress, accumulation of the CM broadcast TS data in the memory 107 is halted. When all the accumulated CM broadcast TS data is decoded and displayed, the media library of the decoder 104 is switched from the broadcast-wave TS to the streaming data. After the above-described series of operations, a re-transmission request of the streaming content is sent to the streaming server so as to update the playback duration of the streaming information storage unit 122, which is suspended while the received data is decoded. Consequently, following the CM, the subscriber can view the remaining streaming program that was interrupted.

When the streaming program is viewed to the end by repeating the above-described operations, the media library is switched to the broadcast-wave TS to display the streaming program selection view broadcast as the main part of the multi-screen program. Within the broadcasting time of the multi-screen program, the subscriber can select and view many desired streaming programs.

The process in a case where a multi-screen program broadcast finishes when a subscriber is viewing a streaming program is described below. The broadcast station sends an immediate-reaction-type event message, wherein descriptor tag=0xCB, indicating program end. The DSMCC_section structure of this event message is slightly different from that of the event message indicating CM start and that of the event message indicating CM end, and the column "reserved future use" following the column "event msg group id" shown in FIG. 9 includes a value indicating the start time of the next program.

Upon receiving the event message indicating program end, the data stream processor 121 of the television receiving apparatus 100 performs one of the following two operations depending upon the information stored in the streaming information storage unit 122. When the streaming information storage unit 122 stores a null value (negative value) indicating that the streaming is being halted, the broadcast-wave data is continuously decoded. On the other hand, when the streaming information storage unit 122 stores a playback duration indicating that streaming program playback is in progress, the value of the playback duration and the streaming program ID are stored in the memory 107 or the hard disk 119. If the subscriber desires to view the remaining portion of the same streaming program at the next broadcasting time, these values are referred to, and a delivery request of the streaming program content from the designated time is sent to the streaming server. Since the user may turn off the television receiving apparatus 100, the memory 107 must be a non-volatile memory such as an NVRAM.

Upon receiving an event message indicating program end during playback of the streaming program, the decoder 104 changes the media library from the library for streaming data to the library for broadcast-wave TS. Also in this case, CM broadcast TS data is accumulated in the memory 107 in order to prevent the beginning of the CM being missed due to the change of the media library. However, if CMs broadcast in this time zone are accumulated and played back in the standard way, the next program may experience a problem. In order to avoid such a problem, time-shifting playback is carried out (see FIG. 11) so that the CMs accumulated in the memory 107 since reception of the event message after the change of media library until the start time of the next program defined in the DSMCC_section structure are decoded and displayed in a period from the media library change time to the start time of the next program. Thus, the subscriber can view the next program from the beginning 1100.

Finally, the process in a case where a subscriber changes the channel to another broadcast station while he/she is viewing a streaming program is described. Like the process in a case where the program finishes, the streaming information storage unit 122 stores the value of the playback duration and the streaming program ID. A suspension request of the streaming content is sent to the streaming server. The FIFO 106 clears the buffer, and the media library of the decoder 104 is changed to the library for broadcast-wave TS. If the subscriber desires to view the remaining portion of the same streaming program when the subscriber changes the channel back to the multi-screen program, referring to the values stored in the streaming information storage unit 122, a delivery request of the streaming program content from the designated time is sent to the streaming server, and the media library of the decoder 104 is changed to the streaming library. This allows for seamless switching between broadcasting and streaming when a subscriber randomly changes programs.

In the first embodiment, the descriptor tag of the DSM-CC_section structure is set to 0xC9, 0xCA, or 0xCB; however, any value unreserved in the ARIB standard may be used. Furthermore, in the first embodiment, CMs are stored in the memory 107; however, CMs may be stored in the hard disk 119. Moreover, in the first embodiment, the streaming information storage unit 122 stores information indicating the playback duration of streaming programs; however, it may store information based on each frame. As described above, when content such as the latest news is offered in place of CMs, it is preferable that reception and/or playback of data sent via a plurality of media be switched in response to an event message, as in the illustrated embodiment.

Second Embodiment

A television receiving apparatus according to a second embodiment of the present invention has a different feature from that of the first embodiment in terms of switching of the media library. In the following description, the difference between the first and second embodiments is described. The same reference numerals are assigned to the same components and operations as those in the first embodiment.

Figure 12:
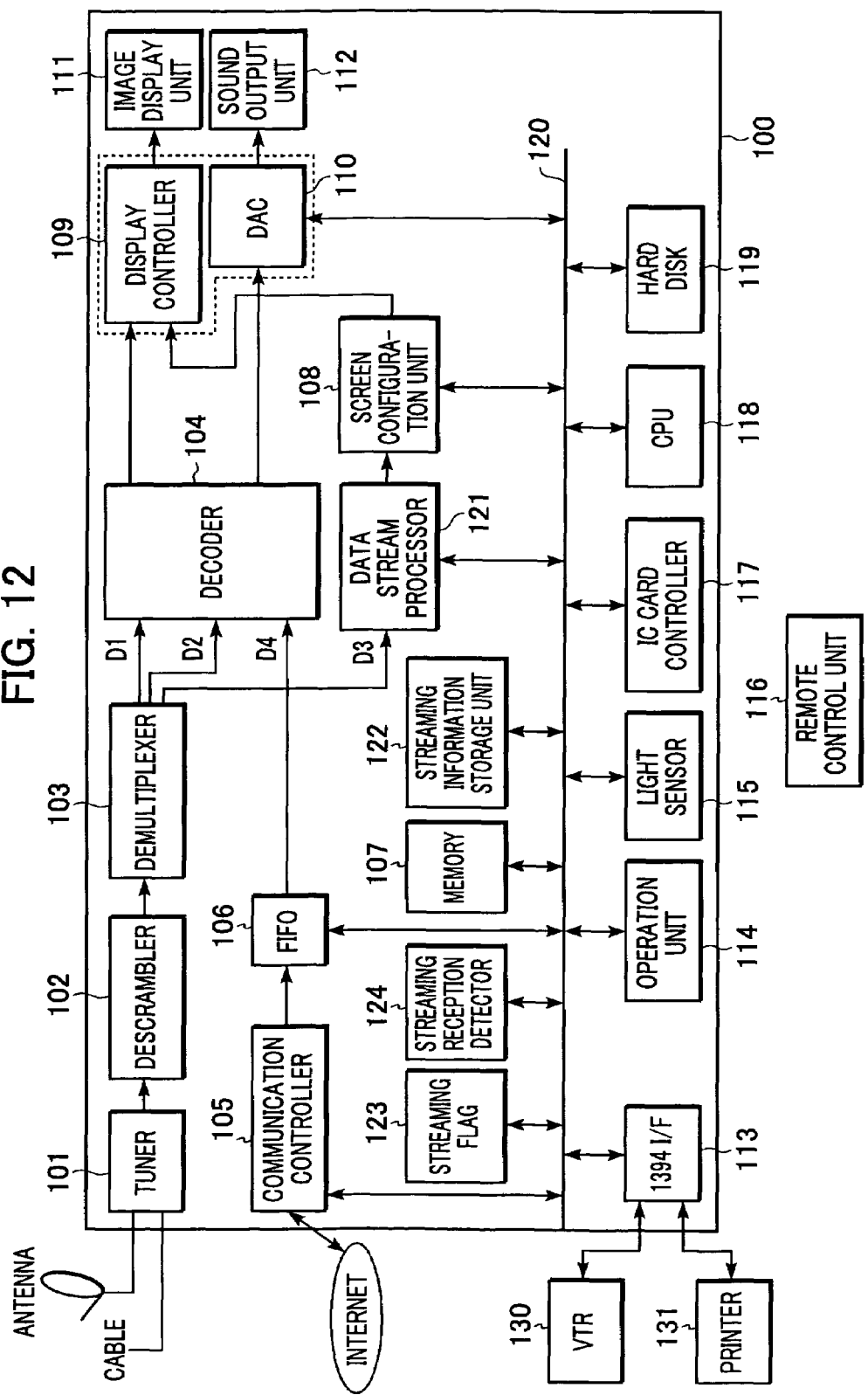
FIG. 12 is a block diagram of a television receiving apparatus according to a second embodiment of the present invention.

FIG. 12 is a block diagram of a television receiving apparatus 100 according to a second embodiment of the present invention. The difference from the television receiving apparatus 100 of the first embodiment is that the television receiving apparatus 100 of the second embodiment further includes a streaming flag 123 and a streaming reception detector 124.

The streaming flag 123 is turned on/off by the CPU 118 when the media library of the decoder 104 changes in response to a media library changing request via the remote control unit 116 and the data stream processor 121. When the CPU 118 changes the media library of the decoder 104 to the library for streaming decoding, the streaming flag 123 is set to one; otherwise, it is set to zero.

Figure 13:
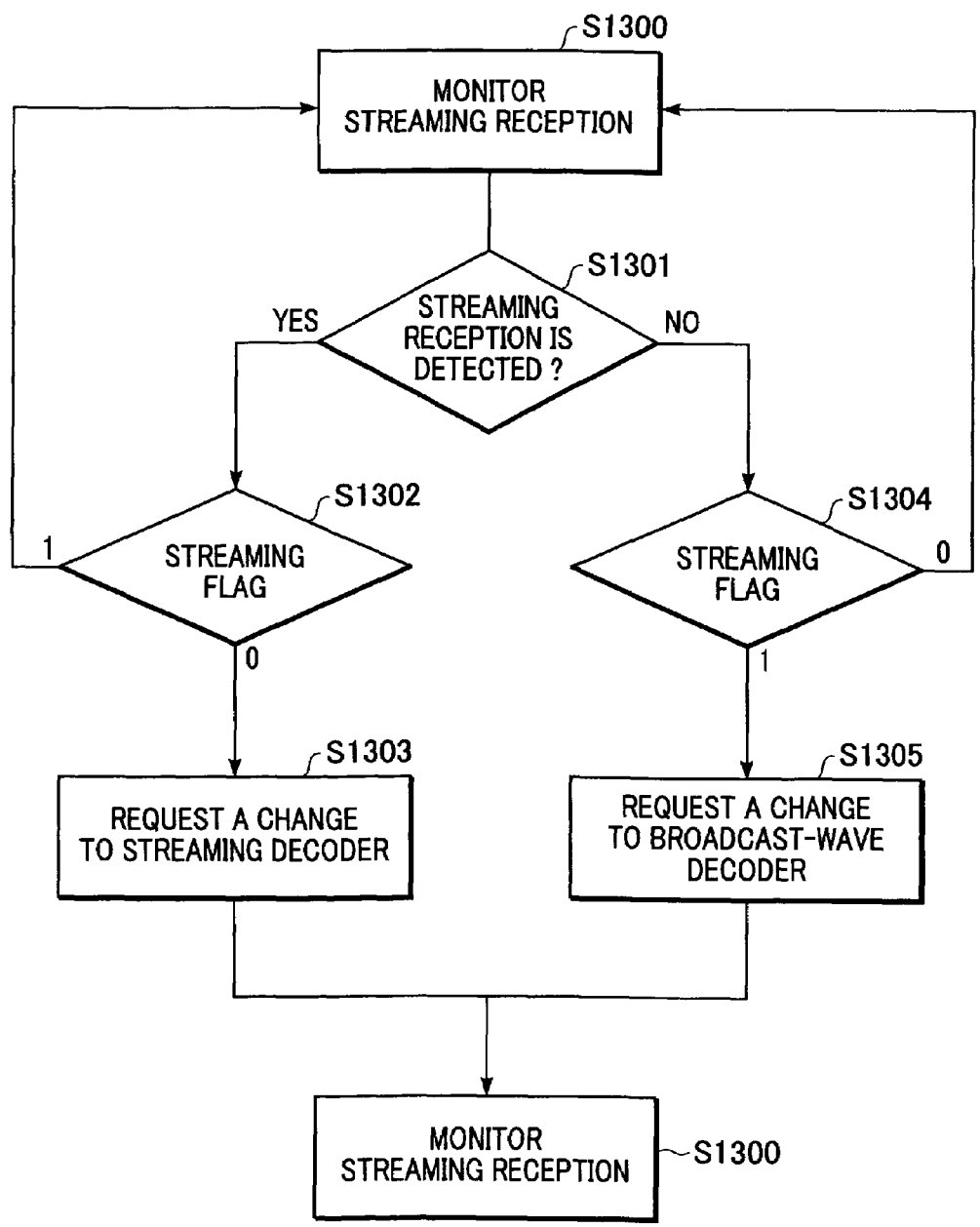
FIG. 13 is a flowchart showing the decoder switching operation according to the second embodiment of the present invention.

The streaming reception detector 124 monitors the communication controller 105, and sends a media library changing request to the CPU 118 for reception of a streaming program and depending upon the status of the streaming flag 123. FIG. 13 is a flowchart of the operation of the streaming reception detector 124. The streaming reception detector 124 monitors streaming detection (step S1300). When it is determined in step S1301 that streaming reception is detected, the streaming reception detector 124 checks the streaming flag 123 as to whether it is turned on or off (step S1302). If the streaming flag 123 is turned on, this means that streaming decoding has already been set, and the process returns to step S1300, in which streaming detection is monitored. If the streaming flag 123 is turned off, the streaming reception detector 124 sends to the CPU 118 a request to change the decoder 104 to the streaming decoder (step S1303).

In response to the request, the CPU 118 changes the media library of the decoder 104 to the library for streaming, and turns on the streaming flag 123. After the above-described series of operations, the streaming reception detector 124 again monitors streaming detection (step S1300). If it is determined in step S1301 that streaming reception is not detected, the streaming reception detector 124 checks the streaming flag 123 as to whether it is turned on or off (step S1304). If the streaming flag 123 is turned off, this means that broadcast-wave decoding has already been set, and the process returns to step S1300, in which streaming detection is monitored. If the streaming flag 123 is turned on, the streaming reception detector 124 sends to the CPU 118 a request to change the decoder 104 to the broadcast-wave decoder (S1305). In response to the request, the CPU 118 switches the media library of the decoder 104 to the library for broadcast waves, and turns off the streaming flag 123. After the above-described series of operations, the streaming reception detector 124 again monitors streaming detection (step S1300). Therefore, without a script-based decoder switching request from the BML browser, the media library of the decoder 104 can be changed immediately.

According to the illustrated embodiments of the present invention, streaming content control can be performed in response to an event message (streaming flag) from a broadcast station, and a plurality of programs desired by a subscriber can be provided by streaming while providing services, e.g., broadcasting the same content to all subscribers at the same time.

According to the illustrated embodiments, there is no need for adding CM information to each item of the streaming content, thus alleviating the burden on content creators. Moreover, CMs can be provided to all subscribers at the same time.

According to the illustrated embodiments, furthermore, subscribers can have a comfortable viewing experience without being sensitive to the difference between broadcast-wave content and streaming content.

For example, when a commercial message embedded in each streaming program is provided to users, the commercial message may be viewed at different times from one user to another, resulting in low creation efficiency. Program sponsors cannot know whether or not commercial messages are successfully offered to all subscribers, and are also difficult to offer time-dependent commercial messages. Content creators must perform a time-consuming operation to embed a commercial message into each item of the content, and, in some cases, must embed different commercial messages according to changes of sponsors or broadcast time, resulting in low efficiency. Such drawbacks are overcome by the present invention.

OTHER EMBODIMENTS

It is to be understood that the objects of the present invention are achieved by loading a storage medium having program code of software realizing the features of the above-described embodiments recorded therein into a system or an apparatus and by causing a computer (or a CPU or an MPU) of the system or apparatus to read and execute the program code stored in the storage medium.

In this case, the program code read from the storage medium realizes the features of the above-described embodiments, and the program code itself and the storage medium having the program code stored therein constitute the present invention.

The storage media which carry the program code can be implemented by, for example, a flexible disk, a hard disk, an optical disk, a magneto-optical disk, a CD-ROM, a CD-R, a magnetic disk, a non-volatile memory card, a ROM, or the like.

It is to be understood that the present invention encompasses not only a case where the program code read by the computer is executed to realize the features of the above-described embodiments but also a case where a portion of or the entirety of the actual process is performed by the OS (operating system) running on the computer according to a command of the program code to realize the features of the above-described embodiments.

It is to be understood that the present invention also encompasses a case where, after the program code read from the storage medium is written to a memory of a function extension board inserted in the computer or a function extension unit connected with the computer, a portion of or the entirety of the actual process is performed by a CPU of the function extension board or the function extension unit according to a command of the program code to realize the features of the above-described embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A television receiving apparatus that receives data via a plurality of types of transmission media and that switches between the plurality of transmission media, comprising:
    a first data receiving unit that receives communication data in accordance with an Internet communication protocol via the Internet from an external device;
    a second data receiving unit that receives broadcast data via a broadcast network from a broadcast station, wherein the broadcast data includes event program data accompanied by a plurality of event messages;
    a decoder that decodes, in accordance with a first decoding method, the communication data received via the Internet by the first data receiving unit and that decodes, in accordance with a second decoding method, the broadcast data received by the second data receiving unit, wherein the first decoding method and the second decoding method are different from one another;
    a display control unit that, when the decoder decodes the communication data received via the Internet, controls to display the decoded communication data on a display, and when the decoder decodes the broadcast data received from the broadcast station, controls to display the received broadcast data on the display;
    a memory unit that stores the event program data received by the second data receiving unit; and
    a control unit that, when the decoder is decoding the communication data received via the Internet in accordance with the first decoding method, and a first event message that accompanies the event program data is received by the second receiving unit, switches the decoder in response to the first event message from decoding the communication data to decoding the event program data read from the memory unit so as to display the event program by the display control unit on the display, and when a second event message that accompanies the event program data is received by the second receiving unit, switches the decoder in response to the second event message from decoding the event program data to decoding the communication data received via the Internet so that the decoded communication data is displayed by the display control unit on the display.

2. A receiving apparatus according to claim 1, wherein the first event message indicates that a commercial message starts or indicates that news content starts, and the second event message indicates that the commercial message ends or indicates that the news content ends.

3. A receiving apparatus according to claim 1, wherein the receiving apparatus further includes a recording unit for recording information on communication data of a program; in response to an event message indicating that the program ends, the first data receiving unit interrupts reception of the communication data of the program; and when a playback request of the program is made again, the first data receiving unit receives the remaining communication data of the program from the external device based on the information on the communication data of the program recorded in the recording unit.

4. A receiving apparatus according to claim 3, wherein the information on the communication data of the program includes identification information of the program and a playback duration of the program.

5. The television receiving apparatus according to claim 1, wherein the broadcast data comprises a streaming content selection program for selecting streaming content, and the communication data comprises streaming content data corresponding to a streaming content selected by a user from the broadcast streaming content selection program.

6. The television receiving apparatus according to claim 1, wherein the control unit still interprets data-broadcasting data included in the broadcast data received by the second data receiving unit, even when decoding the communication data and displaying the decoded communication data, in order to extract at least one of the first and the second event message from the data-broadcasting data.

7. A receiving method for a television receiving apparatus that receives data via a plurality of transmission media and that switches between the plurality of transmission media, the method comprising the steps of:

a first data receiving step of receiving, by a first data receiving unit, communication data in accordance with an Internet communication protocol via the Internet from an external device;

a second data receiving step of receiving, by a second data receiving unit, broadcast data via a broadcast network from a broadcast station, wherein the broadcast data includes event program data accompanied by a plurality of event messages;

a decoding step of a decoder decoding, in accordance with a first decoding method, the communication data received via the Internet by the first receiving unit, and decoding, in accordance with a second decoding method, the broadcast data received by the second data receiving unit, wherein the first decoding method and the second decoding method are different from one another;

a display control step of, when the decoder decodes the communication data received via the Internet, controlling to display the decoded communication data on a display, and when the decoder decodes the broadcast data received from the broadcast station, controlling to display the received broadcast data on the display;

a storing step of storing, in a memory unit, the event program data accompanied with an event message received by the second receiving unit in the broadcast data; and a control step of, when the decoder is decoding the communication data received via the Internet in accordance with the first decoding method, and a first event message that accompanies the event program data is received by the second receiving unit, switching the decoder in response to the first event message from decoding the communication data to decoding the event program data read from the memory unit so as to display the event program by the display control step on the display, and when a second event message that accompanies the event program data is received by the second receiving unit, switching the decoder in response to the second event message from decoding the event program data to decoding the communication data received via the Internet so that the decoded communication data is displayed by the display control step on the display.

* * * * *